United States Patent [19]

Schwitzgebel

[11] Patent Number: 5,292,435
[45] Date of Patent: Mar. 8, 1994

[54] EQUIPMENT AND PROCESS FOR SOLID WASTE MINIMIZATION IN CHROMIUM AND HEAVY METAL REMOVAL FROM GROUNDWATER

[76] Inventor: Klaus Schwitzgebel, 7507 Chimney Corners, Austin, Tex. 78731

[21] Appl. No.: 952,063

[22] Filed: Sep. 28, 1992

[51] Int. Cl.$^5$ ............................................. C02F 1/62
[52] U.S. Cl. ................................. 210/712; 210/718; 210/720; 210/724; 210/747; 210/787; 210/912; 210/913
[58] Field of Search ............... 210/712, 719, 718, 720, 210/724, 726, 739, 747, 750, 757, 787, 912, 913

[56] References Cited

U.S. PATENT DOCUMENTS

| | | | |
|---|---|---|---|
| 3,716,485 | 2/1973 | Robertson | 210/195 |
| 3,901,805 | 8/1975 | Stewart | 210/720 |
| 3,931,007 | 1/1976 | Sugano et al. | 75/109 |
| 3,961,029 | 6/1976 | Senoo | 423/54 |
| 4,086,150 | 4/1978 | Kindl et al. | 210/720 |
| 4,705,639 | 11/1987 | Aldrich | 210/720 |
| 4,724,084 | 2/1988 | Pahmeier et al. | 210/709 |
| 4,814,091 | 3/1989 | Napier et al. | 210/665 |
| 5,000,858 | 3/1991 | Manning et al. | 210/747 |
| 5,008,859 | 3/1991 | Suciu et al. | 210/713 |
| 5,011,610 | 4/1991 | Martin et al. | 210/667 |

FOREIGN PATENT DOCUMENTS

| | | | |
|---|---|---|---|
| 2900823 | 7/1980 | Fed. Rep. of Germany | 210/720 |
| 51972 | 4/1979 | Japan | 210/720 |

*Primary Examiner*—Neil M. McCarthy
*Attorney, Agent, or Firm*—Joseph F. Long

[57] ABSTRACT

A process and equipment is disclosed for minimizing sludge formation in removal of chromium and heavy metals from chromium contaminated groundwater by using sodium sulfite for oxygen removal thereby minimizing the amount of ferrous salt necessary for reduction of chromium VI to chromium III in an alkaline solution and also minimizing the amount of excess iron salt to coprecipitate as an hydroxide to effect essentially complete removal of other heavy metals.

4 Claims, 2 Drawing Sheets

EQUIPMENT AND PROCESS FOR SOLID WASTE MINIMIZATION IN CHROMIUM AND HEAVY METAL REMOVAL FROM GROUNDWATER

BACKGROUND OF THE INVENTION

There has been contamination of groundwater with chromium and/or other heavy metals in some localities and most economical treatment and recycle of groundwater after heavy metal removal is desirable. Most heavy metals will precipitate as gelatinous hydroxides at pH from 8.5 to 9.5 but chromium, when present at a valence of VI, must be reduced to a valence of III in order to be removed by precipitation as an hydroxide. Reducing agents such as sodium sulfite will reduce the chromium VI to chromium III. This reduction has generally been carried out at pH of less than 4 but will also occur at an alkaline pH in the presence of a ferrous salt. Apparently the simultaneous reduction and precipitation aids the reduction reaction. The ferrous salt is converted to a ferric salt by the reduction and ferric salts, when made alkaline will coprecipitate with other heavy metals. Large quantities of water are normally handled in groundwater treatment. Further, the groundwater may contain up to about eight parts per million (ppm) of oxygen and this 8 ppm oxygen will react with stoichiometric quantities of a ferrous salt. If the ferrous salt alone is used then a sufficient quantity to first react with oxygen is needed and additional ferrous salt for chromate reduction is necessary. This results, finally, in a larger volume of ferric hydroxide precipitate. We have found that if the oxygen is consumed by reaction with a water soluble sulfite such as sodium sulfite that approximately a stoichiometric quantity of a ferrous salt is needed to reduce the chromium VI to chromium III. The sodium sulfite reacts to form an innocuous sodium sulfate which is also soluble. With chemistry as outlined, we have the basis of a lower cost treatment system wherein sufficient quantity of an alkali salt is added to react with the oxygen in the water; the pH is adjusted to approximately 7.5 to 9.5 with an alkali such as sodium hydroxide and a ferrous salt is added to reduce chromium VI to chromium III. Further, we have found adding excess ferrous or ferric salt results in coprecipitation of the chromium III and other heavy metals such as cobalt, nickel, zinc, cadmium, manganese, copper, and lead, with the ferric salt as hydroxides. When chromium VI alone is the water contaminant complete removal may be obtained at a pH 7.5 with sulfite and iron treatment as outlined. When heavy metals other than chromium are present, treatment with sulfite for chromium VI reduction and use of excess iron is necessary with optimum hydroxide precipitation occurring at pH of about 9.5. The metal hydroxides may be removed from the water prior to recycle by setting plus filtration, by filtration alone, by use of a cyclone separator or a centrifugal separator, etc. Flocculating agents may be added to a precipitation vessel in order to aid in settling and/or filtration. In one preferred system, the equipment is mounted on a trailer transportable with a tractor and requiring only quick connect flexible couplings to stationary tanks and electrical power to be operable. In the system the solids are preferably settled in a stationary tank and separated using a cyclone separator for further solid thickening ahead of a precoated filter. Many such equipment arrangements may be visualized based on principles as outlined.

SUMMARY OF THE INVENTION

Normally, water exposed to air at about 25° to 30° C. will contain about 8 ppm oxygen. One oxygen atom which has a valence of two, will react with two ferrous ions with valence of two to oxidize these two ferrous ions to a ferric ion with a valence of three. Since iron or Fe has an atomic weight of approximately 56 and oxygen as an atomic weight of 16, we see that one gram atomic weight or 16 grams of oxygen reacts with two grams atomic weight of iron or 112 grams. This means that oxygen in one liter of water containing 8 ppm oxygen or 8 milligrams would react with approximately fifty-six milligrams of the ferrous ion.

Now chromium has an atomic weight of approximately fifty-two and to reduce one gram atomic weight of chromium with a valence of six VI to chromium with a valence of three, III, would require three gram atomic weights of the ferrous ion which has atomic weight of approximately fifty-six. Thus, fifty-two grams of chromium with a valence of six reacts with about one hundred seventy grams of ferrous ion or a three to one weight ratio. One liter of water containing eight parts per million oxygen and one part per million of chromium would require about fifty-six milligrams of ferrous iron to react with the oxygen and about three milligrams of ferrous iron to reduce the chromium VI to chromium III. If oxygen is removed by reacting the oxygen with sodium sulfite to form the soluble sodium sulfate, then only three milligrams of the ferrous ion are required to reduce the chromium. In this instance with one ppm chromium VI, the amount of ferric hydroxide formed by precipitation in an alkaline solution will decrease almost twenty fold by use of the sulfite reducing agent to remove oxygen at the eight parts per million level before the ferrous iron reduction. As the amount of chromium VI increases, the reduction by use of the sodium sulfite will be a correspondingly lower portion of the total volume of precipitate.

Our experimental work is summarized in Tables 1, 2, 3, 4 and 5, and indicates less volume reduction then expected but an advantage in using sodium sulfite along with excess ferrous iron both for removal of chromium alone or total heavy metal removal. For removal of chromium along, a pH of 7.5 with excess ferrous iron is sufficient but with other heavy metals on excess of iron and a pH of about 9.5 gives optimum total metal removal. Tables 1, 2, 3, 4, and 5 are discussed in more detail in the following pages.

The process and equipment is based on the chemistry. Controls for the process allow for a wide variation in the amount of treatment chemicals used, dependent upon composition of contaminants in the groundwater.

In a preferable unit the pump, controls, control panels, cyclone separator and final clean up filter are trailer mounted for portability and are equipped with flexible couplings to connect to necessary large stationary tanks.

DETAILED DESCRIPTION OF THE INVENTION

Figure 1:
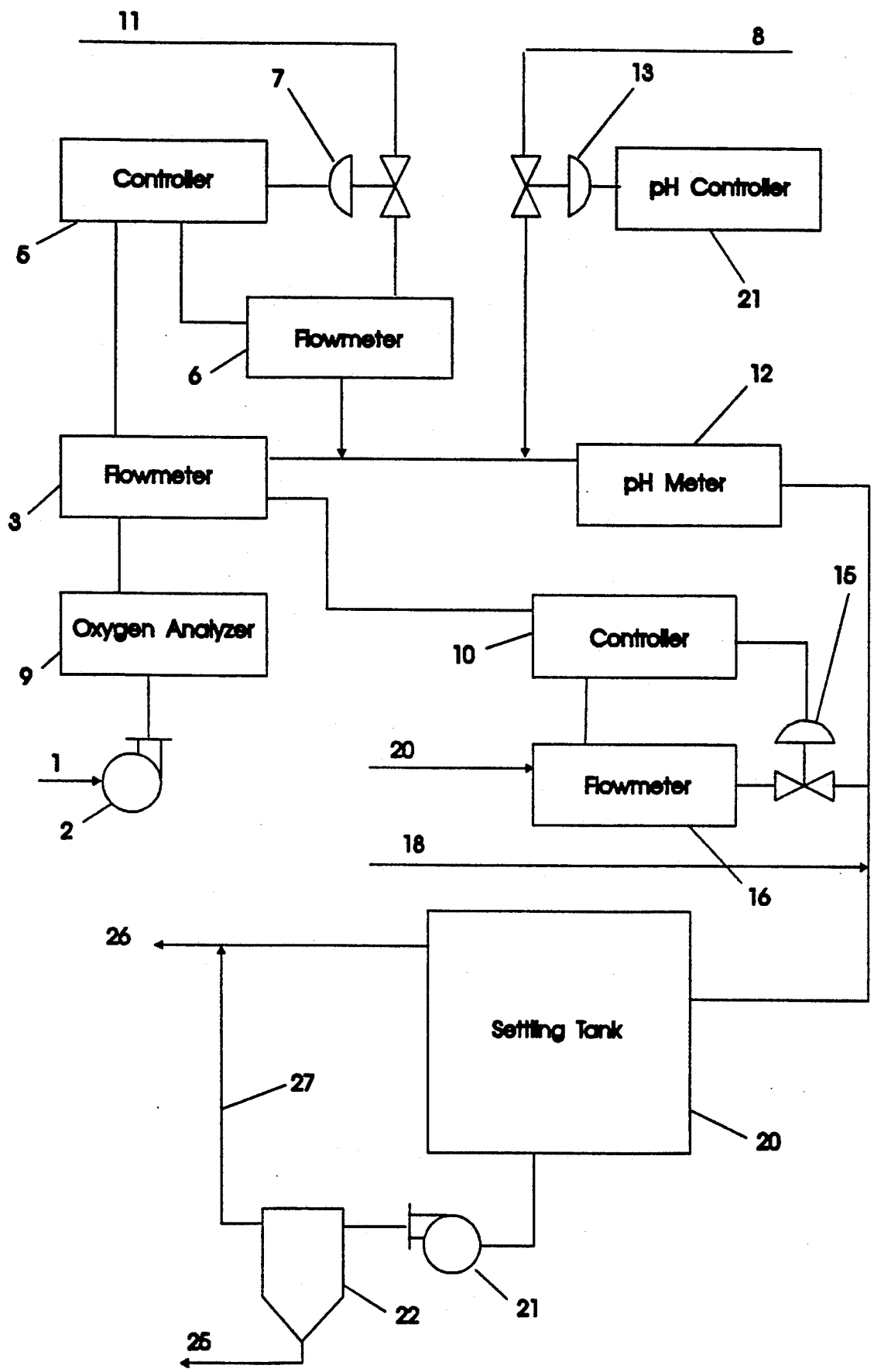
FIG. 1 shows a flowsheet for the process.
Figure 2:
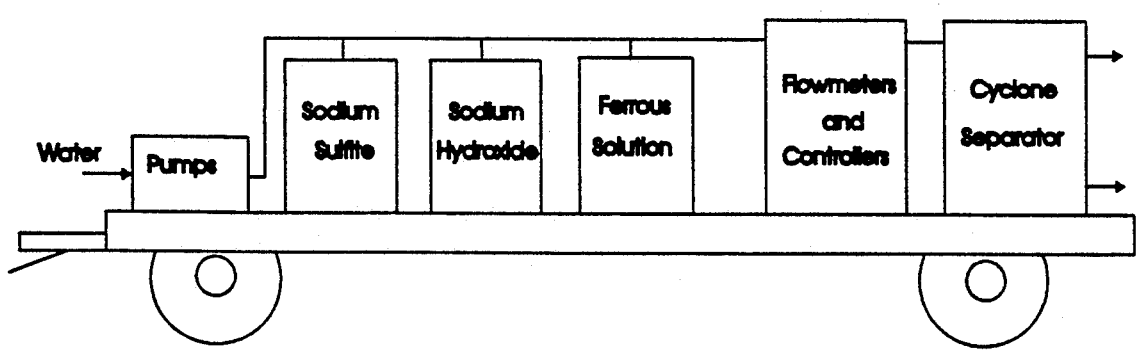
FIG. 2 indicates mounting of equipment for ease of portability.

The chemistry of the process as found experimentally is summarized in Tables 1 through 5.

Experimental data as summarized in Table 1 was carried out as follows:

Ten ppm of chromium VI salts were mixed with 2 ppm each of cadmium, cobalt, copper, manganese, nickel, zinc and iron salts and filtered after adjusting the pH to 8.5. Experiment #32 indicates only about 10% of the chromium, but about 70 to 80% of the other metals were removed. Note that the oxidation-reduction potential, ORP, was a positive 182 MV. In experiment #38 ferrous iron was added while stirring for 20 minutes to maintain a negative MV reading at 70 MV. About 1.9 times the theoretical amount of ferrous iron was needed. Note this amount would be sufficient to also react with about 4 ppm of oxygen. Testing after filtration indicated that less than 0.3 ppm chromium remained and the amounts of the other metals were sharply reduced by this coprecipitation. In experiment 39, 32 mg/liter of sodium sulfite was added. This is theoretically sufficient to remove about 4 ppm oxygen. In this case only 1.6 times the stoichiometric amount of ferrous iron was needed to maintain a negative ORP or MV, indicating chromium reduction, for twenty minutes. Examination of Experiments 40, 41, 42 and 43, indicate that optimum total metal precipitation and removal occurred in 43 with use of 95 mg/liter of sodium sulfite with 2.3 times the stoichiometric amount of ferrous iron; but in #42 with use of 180 mg/liter of sodium sulfite and only 1.2 times stoichiometric iron, removal of metals was essentially equivalent. In this instance, much less sludge would be generated under conditions as in Experiment 42.

TABLE 1

| | | | | Chromium VI | | | | | | | |
|---|---|---|---|---|---|---|---|---|---|---|---|
| Exp # | pH | Sulfite mg/l | ORP MV | Multiples of Stoichiometric Fe | Cr ppm | Cd ppm | Co ppm | Cu ppm | Mn ppm | Wi ppm | Zn ppm | Fe 2 ppm |
| 32 | 8.5 | 0 | +182 | 0 | 8.89 | .70 | .49 | .26 | .50 | .39 | .39 | .39 |
| 38 | 8.5 | — | −70 | 1.9 | .27 | .22 | .12 | .09 | .18 | .14 | .12 | .26 |
| 39 | 8.5 | 32 | −50 | 1.6 | .11 | .12 | .05 | .02 | .08 | .09 | .05 | .25 |
| 40 | 8.5 | 63 | −40 | 1.9 | .16 | .10 | .03 | .00 | .09 | .06 | .02 | .80 |
| 41 | 8.5 | 126 | −20 | 1.2 | .17 | .07 | .01 | .00 | .01 | .03 | .00 | .17 |
| 42 | 8.5 | 189 | −10 | 1.2 | .08 | .07 | .05 | .00 | .22 | .08 | .00 | .27 |
| 43 | 8.5 | 95 | 00 | 2.3 | .05 | .07 | .00 | .00 | .12 | .03 | .00 | 25 |

In Table 2 sulfite was added at 126 mg/liter and the starting solution contained 1 pm chromium VI contaminant. From examination of experiments 50, 51, and 52 at pH 7.5; experiments 53, 54, and 55 at pH of 8.5 and experiments 56, 57 and 58 at a pH of 9.5 we see adequate removal of chromium VI with sulfite addition and a stoichiometric amount of ferrous iron at pH 7.5 and also at a pH of 8.5 as shown in Experiment 55. In Experiment 58 at pH of 9.5 and use of sulfite and with 4.4 times the stoichiometric amount of ferrous iron used to maintain a negative ORP or MV removal of chromium was essentially complete. Similar results were obtained in Experiments 57 and 54 with no sulfite added.

TABLE 2

| | | | Chromium VI a 1 ppm | | | | | | | | |
|---|---|---|---|---|---|---|---|---|---|---|---|
| Exp # | pH | Treatment | Multiples of Stoichiometric Fe | Cr ppm | Cd ppm | Co ppm | Cu ppm | Mn ppm | Ni ppm | Zn ppm | Fe ppm |
| 50 | 7.5 | none | 0. | .96 | — | — | — | — | — | — | — |
| 51 | | Fe II | 2. | .00 | — | — | — | — | — | — | .52 |
| 52 | | Fe II + Sulfite | 1. | .06 | — | — | — | — | — | — | .64 |
| 53 | 8.5 | none | 0. | 1.01 | — | — | — | — | — | — | — |
| 54 | | Fe II | 4.2 | .00 | — | — | — | — | — | — | .00 |
| 55 | | Fe II + Sulfite | 1. | .04 | — | — | — | — | — | — | .11 |
| 56 | 9.5 | none | 0. | .95 | — | — | — | — | — | — | — |
| 57 | | Fe II | 12.4 | .01 | — | — | — | — | — | — | 5.6 |
| 58 | | Fe II + Sulfite | 4.4 | .01 | — | — | — | — | — | — | 1.1 |

In Table 3, the starting solution contained 1 ppm of chromium and 1 ppm of each of the other heavy metals. In Experiments 61, 64, and 67, sulfite was added at 126 mg/liter. Adequate removal with minimal sludge formation was achieved in Experiment 64 for all metals at a pH of 8.5; however, optimum removal of all metals occurred in Experiment 67 with both sulfite and over a seven fold excess of ferrous iron at a pH of 8.5.

TABLE 3

| | | | 1 ppm Cr VI and 1 ppm each of metals | | | | | | | | |
|---|---|---|---|---|---|---|---|---|---|---|---|
| Exp # | pH | Treatment | Multiples of Stoichiometric Fe | Cr ppm | Cd ppm | Co ppm | Cu ppm | Mn ppm | Ni ppm | Zn ppm | Fe ppm |
| 59 | 7.5 | none | 0 | .71 | .15 | .22 | .10 | .28 | .20 | .12 | — |
| 60 | | Fe II | 3.2 | .00 | .05 | .08 | .02 | .19 | .08 | .03 | .16 |
| 61 | | Fe II + Sulfite* | 1.6 | .00 | .65 | .58 | .09 | .63 | .50 | .39 | .07 |
| 62 | 8.5 | none | 0 | .86 | .08 | .15 | .03 | .28 | .13 | .02 | — |
| 63 | | Fe II | 14 | .00 | .01 | .01 | .02 | .01 | .01 | .01 | .00 |
| 64 | | Fe II + Sulfite* | 1.6 | .02 | .04 | .09 | .06 | .12 | .08 | .03 | .18 |

TABLE 3-continued

| | | | 1 ppm Cr VI and 1 ppm each of metals | | | | | | | | |
|---|---|---|---|---|---|---|---|---|---|---|---|
| Exp # | pH | Treatment | Multiples of Stoichiometric Fe | Cr ppm | Cd ppm | Co ppm | Cu ppm | Mn ppm | Ni ppm | Zn ppm | Fe ppm |
| 65 | 9.5 | none | 0 | .87 | .01 | .02 | .02 | .04 | .03 | .02 | — |
| 66 | | Fe II | 26 | .01 | .00 | .00 | .00 | .00 | .00 | .00 | .59 |
| 67 | | Fe II + Sulfite* | 8.4 | .01 | .01 | .00 | .03 | .01 | .00 | .03 | .56 |

*Sulfite added was twice stoichiometric amount for oxygen reduction

In Table 4, the starting solution contained 10 ppm chromium VI only and the experiments were carried out as previously described with 126 mg/liter of sulfite used when so indicated. With this higher chromium VI we get adequate removal with minimum sludge in Experiment 82 at a pH of 7.5; however, optimum removal is indicated in Experiment 85 at pH at 8.5 with similar low sludge formation.

TABLE 4

| | | | Summary: 10 ppm Cr VI Level | | | | | | | | |
|---|---|---|---|---|---|---|---|---|---|---|---|
| Exp # | pH | Treatment | Multiples of Stoichiometric Fe | Cr ppm | Cd ppm | Co ppm | Cu ppm | Mn ppm | Ni ppm | Zn ppm | Fe ppm |
| 80 | 7.5 | none | 0 | 9.52 | — | — | — | — | — | — | — |
| 81 | | Fe II | 2.0 | .17 | — | — | — | — | — | — | .10 |
| 82 | | Fe II + Sulfite* | 1.0 | .05 | — | — | — | — | — | — | .25 |
| 83 | 8.5 | none | 0 | 10.20 | — | — | — | — | — | — | — |
| 84 | | Fe II | 2.5 | .00 | — | — | — | — | — | — | .00 |
| 85 | | Fe II + Sulfite* | 0.8 | .00 | — | — | — | — | — | — | .00 |
| 86 | 9.5 | none | 0 | 9.80 | — | — | — | — | — | — | — |
| 87 | | Fe II | 2.5 | .02 | — | — | — | — | — | — | .81 |
| 88 | | Fe II + Sulfite* | 1.0 | .05 | — | — | — | — | — | — | .28 |

In Table 5, the starting solution contained 10 ppm of Chromium VI and 10 ppm of the other metals before adjusting to a pH as indicated and filtering. Experiment No. 89 indicates the composition of the filtrate.

TABLE 5

| | | | 10 ppm CR VI + 10 ppm each of metals | | | | | | | | |
|---|---|---|---|---|---|---|---|---|---|---|---|
| Exp # | pH | Treatment | Multiples of Stoichiometric Fe | Cr ppm | Cd ppm | Co ppm | Cu ppm | Mn ppm | Ni ppm | Zn ppm | Fe ppm |
| 89 | 7.5 | none | 0.0 | 5.66 | 5.07 | 3.77 | .03 | 5.35 | 3.05 | 1.20 | — |
| 90 | | Fe II | 2.0 | .03 | 1.44 | .55 | .04 | 4.49 | .24 | .08 | .11 |
| 91 | | Fe II + Sulfite* | 1.0 | .18 | 2.92 | 4.00 | .05 | 6.74 | 3.16 | .89 | .08 |
| 92 | 8.5 | none | 0.0 | 5.78 | 2.19 | .45 | .01 | 1.98 | .24 | .00 | — |
| 93 | | Fe II | 2.2 | .00 | .11 | .05 | .02 | 1.60 | .04 | .01 | .00 |
| 94 | | Fe II + Sulfite* | 1.0 | .16 | 1.03 | .64 | .05 | 1.62 | .60 | .46 | .00 |
| 95 | 9.5 | none | 0.0 | 5.94 | .13 | .04 | .05 | .05 | .05 | .03 | — |
| 96 | | Fe II | 1.6 | .06 | .01 | .00 | .03 | .00 | .00 | .01 | .10 |
| 97 | | Fe II + Sulfite* | 0.6 | .39 | .04 | .03 | .03 | .01 | .07 | .07 | .06 |

In this table, Experiment 91 indicates some unexplained results at pH of 7.5 but in any case sufficient metal removal is not obtainable at pH of 7.5. From a review of the Experiments 92 through 97 we see that in Experiment 96 with 1.6 times the stoichiometric amount of ferrous iron at pH of 9.5 adequate metal removal was obtained. From the data in Table 3, we would expect optimum total metal removal with sulfite and several fold excess of ferrous iron.

The process may best be described from the drawings. All pumps and controllers may be portably mounted with flexible connectors for stationary tanks. Pump 2, which is preferably a centrifugal pump picks up the water to be treated 1 and pumps through flowmeter 3. The output measurement signal from flowmeter 3 feeds into controller 5 and controller 10. Controller 5 with input from flowmeter 6 and output to control valve 7 acts to control the flow of an oxygen reducing agent such as an alkaline sulfite 11, with sodium sulfite being preferred, to maintain an operator selectable ratio of reducing agent flow 11 to flow of stream 1. In larger installations a signal output from an oxygen analyzer 9 feeds into controller 5 to automatically adjust the ratio of reducing agent to adjust for any variation in oxygen content of the water being treated. Normally, however the alkaline sulfite used should be about twice the stoichiometric quantity. Oxygen dissolved in the water would normally be less than 8 pm and a manually selected ratio assuming 8 ppm would be adequate for smaller installations. Upstream of the reducing agent addition a pH meter 12 feeds output to controller 21 which acts to control automatic valve 13 to feed an alkali stream 8 such as sodium hydroxide to raise the pH of the stream 1 to between 7.5 and 9.5 with 7.5 being adequate for removal of chromium alone and 9.5 being preferable for total heavy metal removal. In an unbuffered water stream containing minimum carbon dioxide the pH change is quite rapid with minimal change in sodium hydroxide flow and a pH between 7.5 and 11 would be satisfactory.

Controller 10 receives input from flowmeter 3 that measures the stream of water to be treated 1 and input from flowmeter 16 that measures a flow of stream 20 which may be a ferrous salt or a mixture of ferrous and ferric salt in aqueous solution and with these inputs adjusts valve 15 to add an operator selectable ratio of flow of the ferrous or ferrous plus ferric salt to stream 1.

From analysis of stream 1 for chromium and other heavy metals, the amount of ferrous salt for chromium reduction may be easily calculated. With the use of sodium sulfite as outlined, the excess iron for coprecipitation for complete heavy metal precipitation is reduced. Stream 20 may be adjusted in composition and concentration to allow feeding a stoichiometric quantity of the ferrous salt resulting in a minimum amount of metal hydroxide solids to remove chromium when chromium alone is being removed or adjusted to feed a desired excess of about 4 fold stoichiometric for total removal of all heavy metals.

A flocculating agent in stream 18 may be added to aid in settling in tank 20. Clear heavy metal free water 26 overflows from the settler. Experimental data indicates settling ratio of about one inch/minute. Sludge, which is metal hydroxide, feeds pump 21 which then may go through a cyclone separator 22 or any of number of different type solid-liquid separators to concentrate the sludge 25 for disposal while clear liquid 27 may go to overflow as shown or be routed back to the feed.

What is claimed is:

1. A process for removing chromium and other heavy metals including cobalt, nickel, zinc, cadmium, manganese, copper, and lead, from groundwater comprising:
   a) pumping and measuring a flow of groundwater to a solid separator means;
   b) sampling, determining the concentration of chromium VI and oxygen and adding approximately twice the theoretical quantity of an alkali sulfite necessary to form alkali sulfate from said oxygen in said groundwater, said addition being upstream of said solids separator means;
   c) adding an alkali to adjust pH of said flow to a minimum of 7.5 and a maximum of about 11 downstream of said alkali sulfite addition and upstream of said solid separator means;
   d) adding approximately twice the theoretically necessary quantity of a ferrous salt to said flow to reduce said chromium VI to chromium III to thereby coprecipitate chromium III and said other heavy metals as hydroxides upstream of said solids separator and downstream of said alkali sulfite addition;
   e) recycling liquid containing less than one ppm of each of said heavy metals and removing solids from said solids separator means.

2. A process for removing chromium and other heavy metals including cobalt, nickel, zinc, cadmium, manganese, copper, and lead, from groundwater comprising:
   a) pumping and measuring a flow of groundwater to a solid separator means;
   b) sampling, determining the concentration of chromium VI and the concentration of oxygen and adding a stoichiometric quantity of an alkali sulfite for reaction with said oxygen to form alkali sulfate, said adding to said groundwater occurring upstream of said solids separator means;
   c) adding an alkali to adjust pH of said flow to a minimum of 8.5 downstream of said alkali sulfite addition and upstream of said solid separator means;
   d) adding approximately twice the theoretically necessary quantity of a ferrous salt to reduce said chromium VI to chromium III and coprecipitate said chromium III with said other heavy metals as hydroxides;
   e) adding a flocculating agent downstream of said ferrous salt addition;
   f) recycling liquid containing less than one part per million of each of said heavy metals back to the ground and removing metal hydroxides from said solid separator means.

3. A process for removing chromium and other heavy metals including cobalt, nickel, zinc, cadmium, manganese, copper, and lead, from groundwater as in claim 1 by separating said heavy metal hydroxide precipitate from said groundwater in a cyclone separator.

4. A process for removing chromium and other heavy metals including cobalt, nickel, zinc, cadmium, manganese, copper, and lead, from groundwater as in claim 1 by separating said heavy metal hydroxide precipitates from said groundwater in a settling tank.

* * * * *